United States Patent
Choi et al.

(10) Patent No.: US 6,311,802 B1
(45) Date of Patent: Nov. 6, 2001

(54) VELOCITY INSTRUCTION GENERATION APPARATUS FOR CAR OF ELEVATOR SYSTEM AND VELOCITY CONTROL METHOD THEREOF

(75) Inventors: Byoung Wook Choi, Kwangmyoung; Ji Heon Kim, Inchun, both of (KR)

(73) Assignee: LG-Otis Elevator Company, Seoul (KR)

( * ) Notice: Subject to any disclaimer, the term of this patent is extended or adjusted under 35 U.S.C. 154(b) by 0 days.

(21) Appl. No.: 09/385,445

(22) Filed: Aug. 30, 1999

(30) Foreign Application Priority Data

Aug. 28, 1998 (KR) .................................................. 98-35256

(51) Int. Cl.$^7$ ........................................................ B66B 1/28
(52) U.S. Cl. ........................................... 187/293; 187/291
(58) Field of Search ..................................... 187/293, 389, 187/295, 394, 291, 284; 318/59, 66, 68, 268, 278; 73/498, 503

(56) References Cited

U.S. PATENT DOCUMENTS

| | | | | |
|---|---|---|---|---|
| 3,750,850 | * | 8/1973 | Winkler et al. ..................... | 187/29 R |
| 3,773,146 | * | 11/1973 | Dixon, Jr. et al. .................. | 187/29 R |
| 4,128,142 | * | 12/1978 | Satoh et al. ......................... | 187/29 R |
| 4,220,221 | * | 9/1980 | Gingrich ............................. | 187/29 R |
| 4,354,576 | * | 10/1982 | Kajiyama ............................ | 187/29 R |
| 4,567,411 | * | 1/1986 | Reinmann et al. .................. | 318/466 |
| 4,658,935 | * | 4/1987 | Holland ............................... | 187/122 |
| 5,035,301 | * | 7/1991 | Skalski ................................ | 187/118 |

\* cited by examiner

Primary Examiner—Jonathan Salata

(57) ABSTRACT

A velocity instruction generating apparatus for a car of an elevator system and a velocity instruction generating method which make it possible to decrease a computation time, computation amount and computation error by computing a velocity instruction based on an integer number computation and control the velocity of the car in real time.

18 Claims, 12 Drawing Sheets

| CONTROL PERIOD |
|---|
| KIND OF MOTOR |
| STANDARD VEL. |
| TM KIND |
| # OF ENCODER PULSE |
| ROPPING |
| MAX ACC. |
| MAX JERK |
| DOOR ZONE PLATE |
| DOOR ZONE LENGTH |

| DIA. |
|---|
| GEAR RATIO |
| DIA. |
| GEAR RATIO |
| DIA. |
| GEAR RATIO |
| DIA. |
| GEAR RATIO |

VELOCITY INSTRUCTION GENERATION APPARATUS FOR CAR OF ELEVATOR SYSTEM AND VELOCITY CONTROL METHOD THEREOF

BACKGROUND OF THE INVENTION

1. Field of the Invention

The present invention relates to an elevator system, and in particular to a velocity instruction generation apparatus for a car of an elevator system and a velocity control method which are capable of decreasing an arithmetic operation time, operation amount and operation error and controlling the velocity of a car in real time by integer-operating a velocity instruction for controlling the velocity of the car.

2. Description of the Conventional Art

Generally, in an elevator system, a Direct Current (DC) motor or an induced motor moves an elevator car connected with the rotation axis of the motor through a cable or a pneumatic mechanism. The driving operation of the motor should be properly controlled so that an elevator car is accurately stopped and started from a certain floor of a building. In order to properly control the driving operation of the motor, variables related to the driving operation of the motor should be properly defined, and the units of the variables should be defined. The variables and the units of the variables are defined in the specification of an elevator system. Generally, the specification of the elevator system is defined in the MKS unit.

The operation controller formed of a microcomputer chip generates a velocity instruction signal of the MKS system in real time without changing the units of the constants based on the constants of the system specification of the MKS system and controls the operation of the car for thereby preventing a certain error during the operation of the elevator system, so that a certain elevator car operation is implemented.

The elevator car velocity instruction generation apparatus for a conventional elevator system will be explained.

FIG. 1 is a view illustrating a schematic block diagram of the conventional elevator system which includes an elevator car 180 for boarding passengers thereon, a door zone plate 170 installed at each floor for indicating an absolute floor, a balance weight 160 connected with the car 180 by a rope through a sheave of a winding machine (not shown), a motor 150 for upwardly and downwardly moving the car 180, a rotary encoder 140 for outputting pulses as rotating the shaft of the motor 150, a velocity controller 120 for outputting a velocity control signal for controlling the driving operation of the motor 150 in real time in accordance with the position of the car 180, an amplifier 130 for supplying an electric power to the motor 150 in accordance with the velocity control signal, a position detector 190 installed at the upper portion of the car 180 for detecting an absolute floor by detecting the door zone plate 170, and an operation controller 110 for receiving an output signal from the position detector 190 and pulses outputted from the rotary encoder 140, computing the velocity instruction signal for controlling the velocity of the car 180 and outputting to the velocity controller 120.

FIG. 2 is a view illustrating a conventional velocity instruction generation apparatus which includes a signal processing unit 111 for controlling an elevator system and computing a running distance of a car 180, an EEPROM 112 for storing the specification of the elevator system, a ROM 113 for storing a program for controlling the elevator system, a RAM 114 for temporarily storing a computation data when computing the velocity instruction signal, and a counter 115 for counting pulses.

In detail, the signal processing unit 111 includes a pulse input unit 11 for receiving a pulse signal outputted from the rotary encoder 140, a traveling distance computation unit 12 for counting the number of pulses received into the pulse input unit 11 and computing the traveling distance of the car 180, a floor height computation unit 13 for judging the present position of the car 180 based on the distance computed by the traveling distance computation unit 12, a car stop determination computation unit 14 for determining the stop position of the car 180, a time based velocity instruction computation unit 15 for transferring a velocity instruction signal corresponding to time stored in the EEPROM 112 at the time of the operation start point of the car 180 to the velocity controller 120, and a distance based velocity instruction computation unit 16 for transferring a velocity instruction signal corresponding to the distance stored in the EEPROM 112 to the velocity controller 120 with respect to the stop instruction of the car 180.

The operation of the velocity instruction generation apparatus for a conventional elevator system will be explained.

When a passenger calls the car 180 at a certain floor, the signal processing unit 111 of the operation controller 110 performs an operation control program stored in the ROM 113 and transfers the velocity instruction signal V(t) to the velocity controller 120. The velocity controller 120 which received the velocity instruction signal v(t) outputs a velocity control signal to the amplifier 130, and the amplifier 130 controls the rotation speed of the motor 150 based on the velocity control signal.

When the car 180 begins to move, the rotary encoder 140 connected with the shaft of the motor 150 outputs pulses. The running distance computation unit 12 receives the pulses via the pulse input unit 11 and computes the running distance of the car 180 by counting the number of pulses. The floor computation unit 13 computes the current floor and the previous floor of the moving or moved the car 180 based on the computed running distance of the running distance computation unit 12.

The stop determination computation unit 14 which receives the value corresponding to the current position of the car and the value corresponding to the previous floor outputted from the floor computation unit 13 computes the control values stored in the EEPROM 117 and the thusly received values and determines the destination floor at which the car 180 arrives.

When the car 180 moves to approximately the destination floor, the position detector 190 installed on the upper portion of the car 180 detects the door zone plate 170. When the position detector 190 accurately detects the position of the door zone plate 170, a certain output signal is outputted to the signal processing unit 111. Therefore, the time based velocity instruction computation unit 15 of the signal processing unit 111 is inactivated, and the distance based velocity instruction computation unit 16 is activated, so that the car 180 is stopped. The distance based velocity instruction computation unit 15 reads the distance based velocity instruction signal v(t) stored in the EEPROM 112 and outputs the velocity instruction signal v(t) to the velocity controller 120, and the velocity controller 120 outputs a velocity control signal, so that the rotation of the motor 150 is decreased and the car 180 arrives at the destination floor. When the car 180 arrives at the destination floor, the rotation of the motor 150 is stopped.

With an elevator system specification, the elevator car velocity instruction generation aparatus in accordance with the conventional art will be explained as follows.

In the specification of an elevator system, for example, if the maximum jerk Jmax is defined as 1 m/s³, the maximum acceleration Amax is defined as 1 m/s², the maximum velocity Vmax is defined as 2 m/s, and the minimum height of a floor is defined as 2.5 m, the operation of the elevator car velocity instruction generation aparatus in accordance with the conventional art will be explained.

The velocity controller 120 controls the rotation of the motor in three types as shown in FIGS. 3 through 5 in accordance with the running distance of the car.

FIG. 3 illustrates the profiles of a velocity of a car, an acceleration and a jerk when a car runs long distance over the time, and the car decelerates at a certain time after the car reached the maximum velocity and maximum acceleration.

FIG. 4 illustrates the profiles of a velocity, an acceleration and a jerk of a car when the car runs long distance over the time, and the car does not reach the maximum velocity but reaches the maximum acceleration and then is decelerates and is stopped.

FIG. 5 illustrates the profiles of a velocity, an acceleration and a jerk of a car when the car runs short distance over the time, and the car does not reach the maximum velocity and maximum acceleration but decelerates at a certain time and then is stopped.

Here, the numeral references 31*a*, 32*a* and 33*a* represent velocity profiles of the car, 31*b*, 32*b* and 33*b* represent acceleration profiles of the car, 31*c*, 32*c* and 33*c* represent jerk profiles of the car, and T1 through T6 and TE represent the time points at which the movement state of the car is changed.

The velocity control method of the car for a conventional elevator system will be explained with reference to FIG. 6.

When a passenger calls a car, the operation controller detects the floor (destination floor) at which the passenger called the car and the floor (current floor) at which the car is currently positioned and computes the distance of the MKS system by computing the difference between the destination floor and the current floor.

First, the difference value between the encoder value FLH of the destination floor and the encoder value C of the current floor of the car is obtained for thereby computing the running distance L of the car in Step SP41 based on the following equation 1.

$$L' = FLH - C [\text{pulse}] \quad (1)$$

At this time, the number of pulses per the unit running distance of the car 180 is computed based on the following equation (2) using the gear ratio G, the diameter D of a traction machine TM, and the number E of the encoder pulses outputted when a pulley of the motor is rotated one time.

$$PM = \frac{G}{3.14 \times D} \times E [\text{pulse/m}] \quad (2)$$

Therefore, in order to change the running distance of the car into the MKS system, the physical amount of the MKS system should be changed based on equations (1) and (2). Therefore, it is possible to obtain the running distance L[m] of the MKS system by dividing equation (1) by equation (2).

$$L = \frac{(FLC - C)}{\frac{G \times E}{3.14 \times D}} [\text{m}] \quad (3)$$

Here, the jerk acceleration time Tr and minimum running distance (Lmin) of the elevator system are obtained based on equations (4) and (5).

$$Tr = \frac{A\max}{J} = 1s \quad (4)$$

$$L\min = \frac{2 \times A\max^3}{J^2} = 2m \quad (5)$$

where Amax represents the maximum acceleration, and J represents a jerk.

The operation controller 110 computes a running distance L' of the pulse unit and a running distance L of the MKS units, and compares the running distance L of the car and the minimum running distance Lmin obtained based on equation 4 in Step SP 42. As a result of the comparison, if it is judged that the running distance L is smaller than the minimum running distance Lmin, since the car runs short distance, the velocity profile of the car is determined as shown in FIG. 5 in Step SP 44. If the running distance L is larger than the minimum running distance Lmin, the running distance L is compared with the running distance based on the following equation 5 in Step SP 43.

$$L < \frac{A\max^2 \times V\max + V\max^2 \times J}{J \times A\max} \quad (6)$$

At this time, if the running distance L in the Step SP 43 is larger than the running distance of equation (6), since the car runs long distance, the velocity profile of the car is determined as shown in FIG. 3 in Step SP 45. If the above-described running distance is smaller than the running distance of equation (6), since the car runs intermediate distance, the velocity profile of the car is determined as shown in FIG. 4 in Step SP 46.

When the velocity profiles of the car are determined, the operation controller 110 sets the initial time to 0 in order to determine the operation time of the car in Step SP 47 and computes the velocity instruction signal v(t) at a certain time (t) and outputs the velocity instruction v(t) to the velocity controller 120 in Step SP 48. Thereafter, the velocity controller computes the velocity control signal by the unit of the pulses in accordance with the velocity instruction signal, and the thusly computed signals are outputted to the motor 150, so that the motor 150 is controlled.

When the car 180 is moved, the rotary encoder 140 outputs the pulses, and the signal processing unit 111 receives the output pulse and computes the previous position and the current position of the car based on equation (1) in Step SP 49. In addition, the car runs depending on the set velocity profiles until the car arrives at the destination floor. Thereafter, the car computes the decelerating distance R of the car at a certain position in Step SP 50. When the car arrives at the above-described position, it is judged whether the operation time of the car 180 is decreased in Step SP 51. If the car is not decelerated, the operation velocity and position of the car 180 are computed, and the thusly computed velocity instruction signal is outputted to the velocity controller 120 in Steps SP 52, SP 48, SP 49.

When the car 180 arrives at a certain position, and the velocity of the car 180 is decreased in Step SP 50, the deceleration instruction signal v(t) of the car 180 is outputted to the velocity controller 120, and the velocity controller 120 computes the deceleration instruction signal V(t) by the unit of the encoder pulses and outputs the velocity control signal of the unit of the encoder pulse to the velocity controller 120 for thereby decreasing the rotation of the motor in Step SP 53. The operation controller 120 outputs a certain time deceleration instruction signal V(t) to the velocity controller 120 until the car 180 arrives at a certain stop position in Steps SP 54 and SP 55. If it is judged that the car 180 arrived at a certain position, the car is stopped.

In the above-described velocity instruction generation apparatus for a car of a conventional elevator system and a velocity control method thereof, in order to control the operation of the car, the variables of the unit of the encoder pulses are detected and changed to the MKS units of the specification of the elevator system for thereby computing the running distance, velocity and time of the MKS units. Next, a control signal is generated for controlling the car using the parameter of the MKS system, and the motor is controlled by changing the control signal into the units of the encoder pulses. Therefore, all computations are performed based on real number computation. In order to compute the running distance, the pulses are sampled, and the parameter of the pulse units are changed into the parameter of the MKS units based on integer computation. Therefore, the computation velocity for controlling the operation velocity of the car is decreased, and the number of the computations is increased.

In order to overcome the above-described problems, a co-processor capable of performing a real number computation is additionally required. In this case, the co-processor is expensive, and an operation speed is slow compared to the integer number computation.

In addition, in the velocity instruction generation apparatus for the car of a conventional elevator system, the specification is stored in the ROM depending on the conditions such as the number of passengers, velocity, transaction machine (T/M), etc. irrespective of the time and distance bases when computing the velocity instruction signal. Therefore, in the conventional art, in order to meet various specification conditions of the elevator system with respect to the number of passenger, the velocity of a winding machine and a motor, etc., a large capacity of ROM is required or a certain operation method which is capable of controlling various operation programs in accordance with the velocity and winding machine is used. In addition, in order to increase a resolution of the velocity instruction signal, various data should be used. Therefore, for the above-described reasons, a large number of ROM are required.

In addition, in the conventional velocity instruction generation apparatus for a car of an elevator system, since the size of the ROM is small to store the data, it is impossible to implement an accurate resolution of the previously computed velocity instruction signal. So, there is a problem that it is impossible to accurately compute the velocity instruction even when performing a distance based computation. In order to overcome the above-described problem, a plurality of ROMs capable of storing a large size of data using a certain program may be provided. In this case, the fabrication cost of the system is increased.

SUMMARY OF THE INVENTION

Accordingly, it is an object of the present invention to provide a velocity instruction generating apparatus for a car of an elevator system which is capable of computing a control variable used for controlling the velocity of a car of an elevator system based on the unit and control period of a detection unit installed at an elevator system.

It is another object of the present invention to provide a velocity instruction generating apparatus for a car of an elevator system which is capable of controlling the velocity of a car of an elevator system by computing a velocity instruction of an elevator system based on the pulse unit and control period unit.

It is another object of the present invention to provide a velocity instruction generating apparatus for a car of an elevator system which is capable of computing a velocity control variable of a car in real time, generating a velocity instruction for each interval of a velocity profile and controlling an elevator system in real time.

It is another object of the present invention to provide a velocity instruction generating apparatus for a car of an elevator system which is capable of computing a high resolution velocity instruction using a minimum spec data.

It is another object of the present invention to provide a velocity control method for a car of an elevator system which is capable of computing a control variable which is used for controlling the velocity of a car of an elevator system based on the unit of a detection unit installed at an elevator system and a control period for thereby effectively controlling the velocity of a car.

To achieve the object, there is provided a velocity instruction generating apparatus for an elevator system which is directed to computing the unit of a velocity instruction of a car from the unit of a spec of an installation site of the elevator system into the unit of a signal detected based on a running operation of the car and controlling the running velocity of the car in real time in accordance with the thusly integer-computed and converted velocity instruction.

To achieve the another object, there is provided a velocity instruction generating apparatus for a car of an elevator system which comprises a state controller for detecting a state of an elevator system and outputting a certain control signal, a rotation detection unit for detecting the rotation of a motor and outputting a pulse signal, a spec setting unit for storing an installation site spec of the elevator system, a control variable converting unit for converting the unit of the control variable used for controlling the velocity of the car into the unit of the pulse control period from the installation site spec unit defined in the spec setting unit, a signal processing unit for receiving a control signal from the state controller and a control variable having the pulse control period unit converted by the control variable converting unit and outputting a velocity control signal for controlling the velocity of the car and a velocity controller for receiving a velocity control signal from the signal processing unit and controlling the velocity of the motor.

To achieve the further object, there is provided a method which comprises a first step for computing a control variable from a system spec and storing the computed control variable, a second step for determining a velocity profile based on a running distance over which the car runs when there is a car call from a user, a third step for generating a velocity instruction for each interval based on the velocity profile determined in the second step for thereby running the car; and a fourth step for detecting a position at which the car decelerates from the velocity profile, generating a time based deceleration instruction, operating the car based on the deceleration instruction, generating a distance based velocity instruction when the car arrives at a certain position corresponding to the door zone, operating the car based on the distance based velocity instruction and stopping the car.

DETAILED DESCRIPTION OF THE PREFERRED EMBODIMENTS

Figure 7:
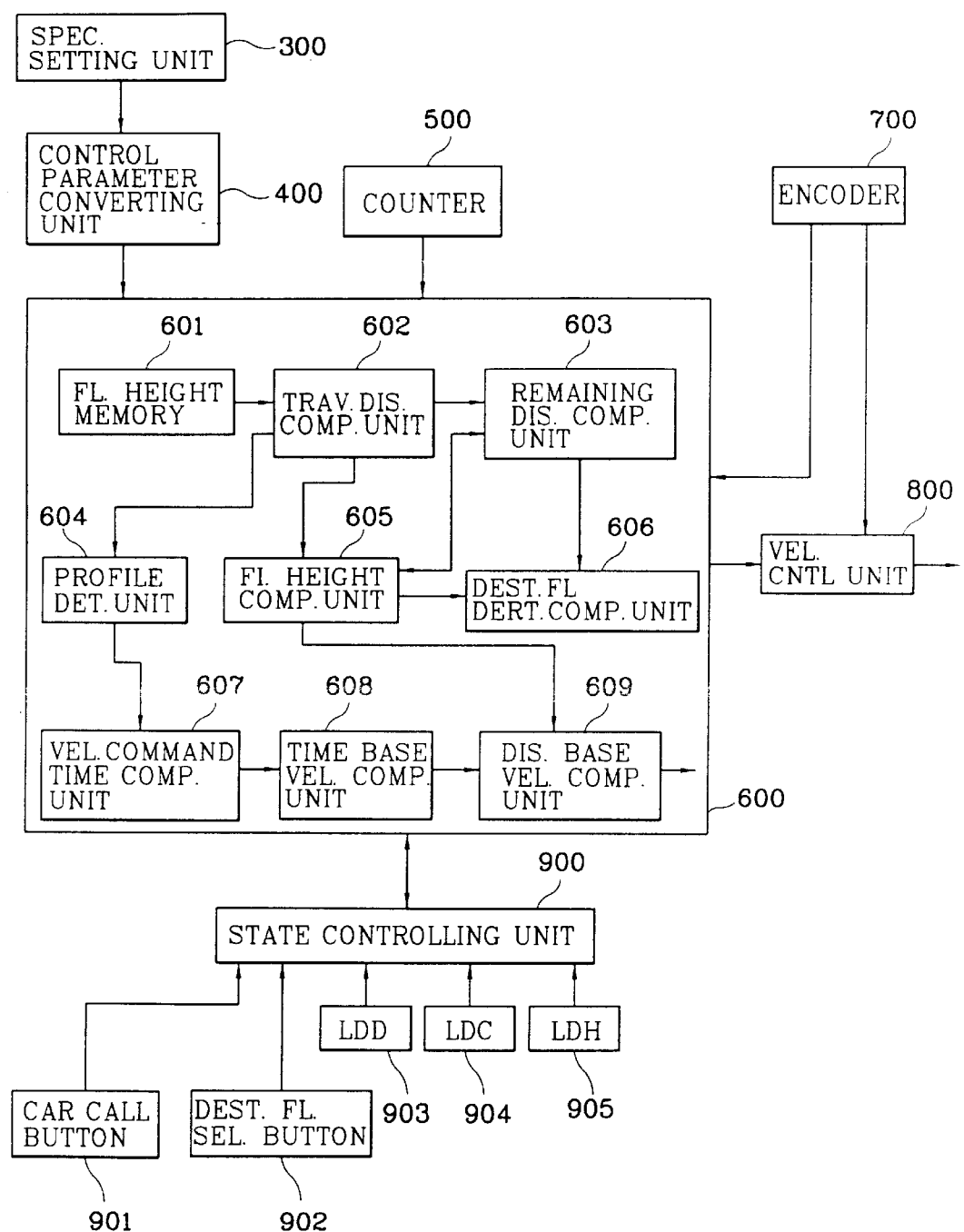
FIG. 7 is a view illustrating the construction of a velocity instruction generation apparatus for a car of an elevator system according to the present invention.

FIG. 7 is a schematic block diagram of a velocity instruction generating apparatus for a car of an elevator system in accordance with the present invention which includes a specification setting unit 300 for storing the current specification used at an elevator system installation site and freely changing the specification, a control parameter converting unit 400 for converting a control parameter of the pulse and the control period unit [PCT] in accordance with a control constant defined in the specification, a counter 500 for determining a control period, a rotary encoder 700 for outputting pulses in accordance with the rotation of the shaft of a motor, a state controller 900 for controlling the state of the elevator system, and a signal processing unit 600 for receiving a signal outputted from the control parameter converting unit 400, a signal outputted from the state controller 900 and pulses outputted from the rotary encoder 700, and outputting a velocity instruction signal to the velocity controller 800 for controlling the velocity of the car.

Here, the state controller 900 includes a car call button 901 used when calling a car, a destination floor selection button 902 by which a user can select a destination floor, a landing position detection unit (LDD) 903, a landing position detection unit (LDC) 904, and a landing position detection unit (LDH) 905, so that the car correctly lands at a destination floor.

In addition, the signal processing unit 600 includes a floor height memory unit 601 for memorizing an absolute floor height, a running distance computation unit 602 for computing a running distance between an destination floor of a user and the current floor of the car, a velocity profile determination unit 604 for determining a running velocity of a car based on a running distance computed by the running distance computation unit 602, a remaining distance computation unit 603 for computing a remaining distance over which the car runs to the destination floor based on an inputted pulse when the car runs using the determined velocity profile, a stop floor computation unit 606 for computing a car stop floor based on the remaining distance computed by the remaining distance computation unit 603 and the position of the car computed by the floor position computation unit 605, a velocity instruction time computation unit 607 for computing a velocity instruction time for each interval based on the determined velocity profile, a time based velocity computation unit 608 for computing the velocity based on the interval based velocity instruction time, and a distance based velocity computation unit 609 for detecting the floor position of the car computed by the floor position computation unit 605 and computing a distance based velocity instruction from the position when the car lands at a certain position before the car lands at the destination floor.

Figures 8, 9:
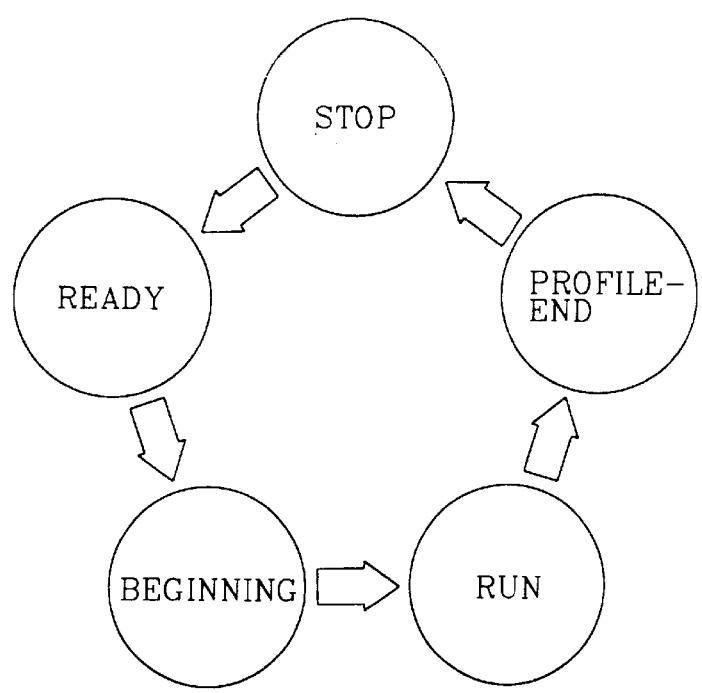
FIG. 8 is a view illustrating control variables of a specification for an elevator system according to the present invention.
FIG. 9 is a view illustrating an operation state for an elevator system according to the present invention.

FIG. 8 is a schematic block diagram illustrating control constants defined in the specification of the elevator system which included a control period, a motor type, a rated velocity, a TM kind, the number of encoder pulses, a ropping, a maximum acceleration, a maximum jerk, a door zone plate, a door zone length, etc. In particular, In the kinds of the TMs, pairs of the diameter of gear and gear ratios of the driving force which are provided as many as the number of the TMs.

FIG. 9 is a schematic block diagram illustrating a transition state of the elevator system. The state of the system is controlled by the state controller of the elevator system in a sequence of the stop, ready, start, operation, and velocity profile end.

Figures 10A, 10B, 10C:
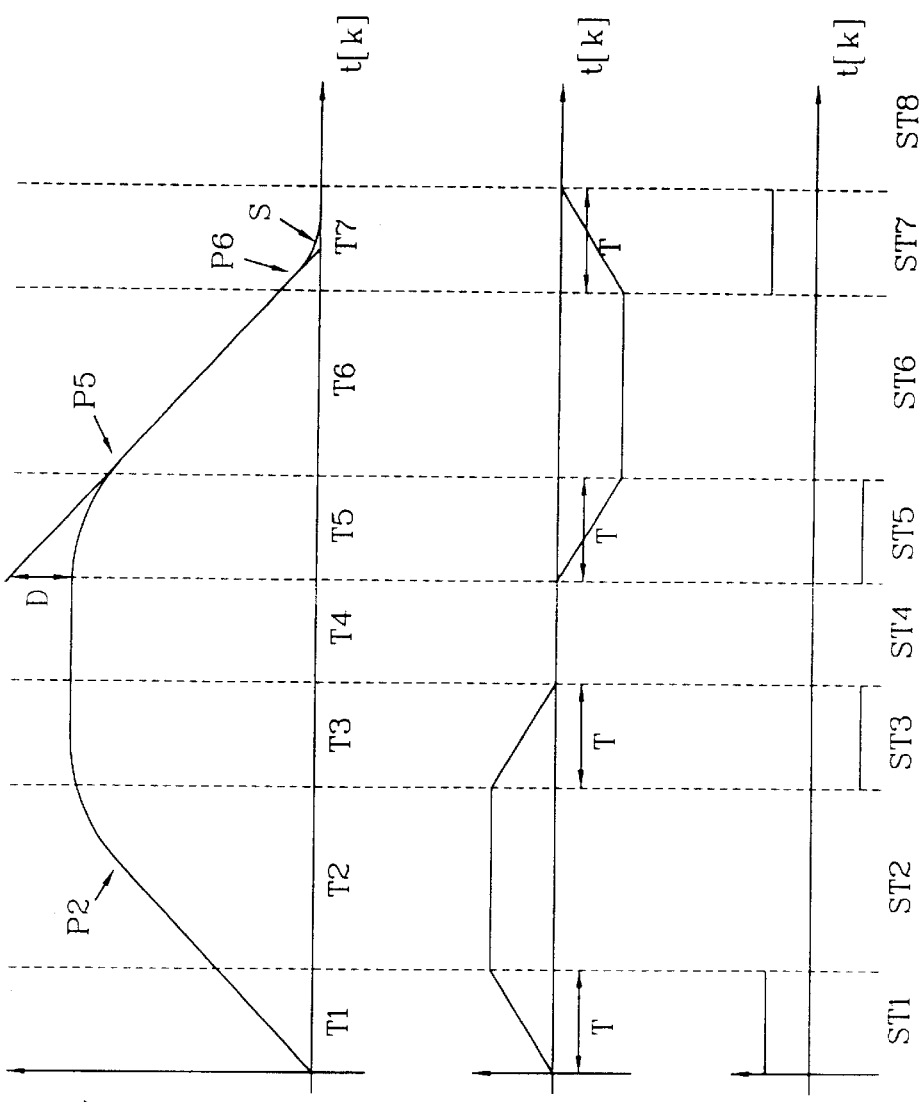
FIG. 10A is a view illustrating a profile of a velocity with respect to the control period k of the car.
FIG. 10B is a view illustrating a profile of an acceleration with respect to the control period k of the car.
FIG. 10C is a view illustrating a profile of the jerk with respect to the control period k of the car.

FIGS. 10A through 10C are views illustrating the profiles of a velocity, acceleration and jerk with respect to the control period of the car. FIG. 10A illustrates a profile of a velocity with respect to the control period k of the car, FIG. 10B illustrates a profile of an acceleration with respect to the control period k of the car, and FIG. 10C is a profile of the jerk with respect to the control period k of the car, where a represents an acceleration, v represents a velocity, and j represents a jerk.

In addition, the variations of the velocity based on the control period and the acceleration and jerk acceleration are classified into T1~T7 for each interval, and the steps for the interval T1~T7 are defined as ST1~ST8, and T represents an interval in which the acceleration is varied.

Figure 11:
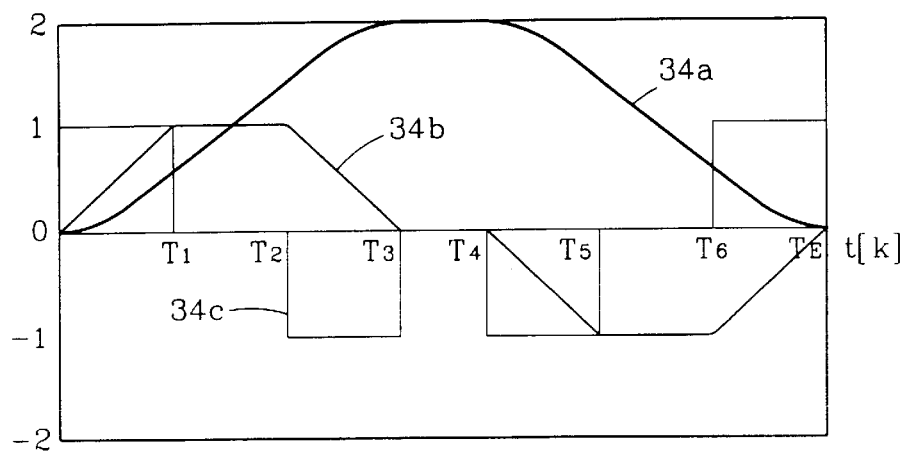
FIG. 11 is a view illustrating profiles with respect to a movement of a car when a car runs a relatively long distance.
Figure 12:
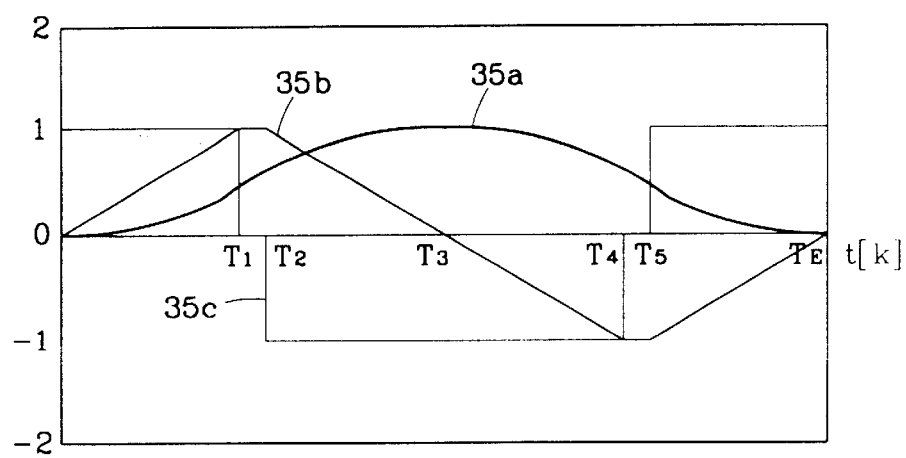
FIG. 12 is a view illustrating profiles with respect to a movement of a car when a car runs an intermediate distance.
Figure 13:
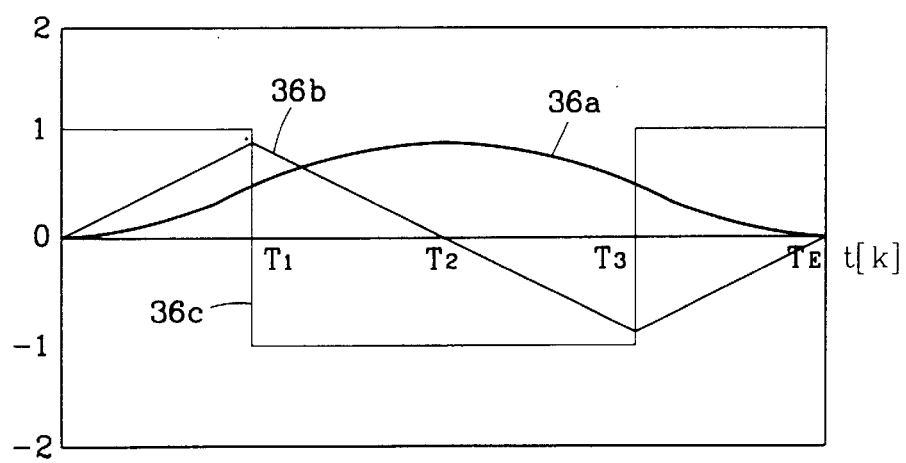
FIG. 13 is a view illustrating profiles with respect to a movement of a car when a car runs a relatively short distance.

For example, assuming that the maximum jerk Jmax=1 m/s³, the maximum acceleration Amax=1 m/s², the maximum velocity Vmax=2 m/s, and the minimum height H of the floor is 2.5 according to the specification of the elevator system set by the specification setting unit 300, the velocity controller 120 controls the rotation of the shaft of the motor based on three modes as shown in FIGS. 11 through 13 in accordance with the distance over which the car runs.

FIG. 11 illustrates the profiles of the velocity, acceleration and jerk of the car based on the control period k to run a relatively long distance. In this case, the car runs at the maximum velocity Vmax and maximum acceleration Amax and then decelerates at a certain position and stops.

FIG. 12 illustrates the profiles of the velocity, acceleration and jerk of the car based on the control period k to run an intermediate distance. In this case, the car does not reach the maximum velocity but reaches the maximum acceleration and then decelerates and stops.

FIG. 13 illustrates the profiles of the velocity of the car based on the control period k, the acceleration and jerk to run a relatively short distance. In this case, the car does not reach the maximum velocity and the maximum acceleration, and decelerates at a certain position and stops.

Here, reference numerals 34*a*, 35*a* and 36*a* represent the profiles with respect to the velocity of the car, and 34*b*, 35*b* and 36*b* represent the profiles with respect to the acceleration, and 34*c*, 35*c* and 36*c* represent the profiles with respect to the jerk, and T1–T6 and TE represent the time points at which the movement state of the car is changed.

Figure 14:
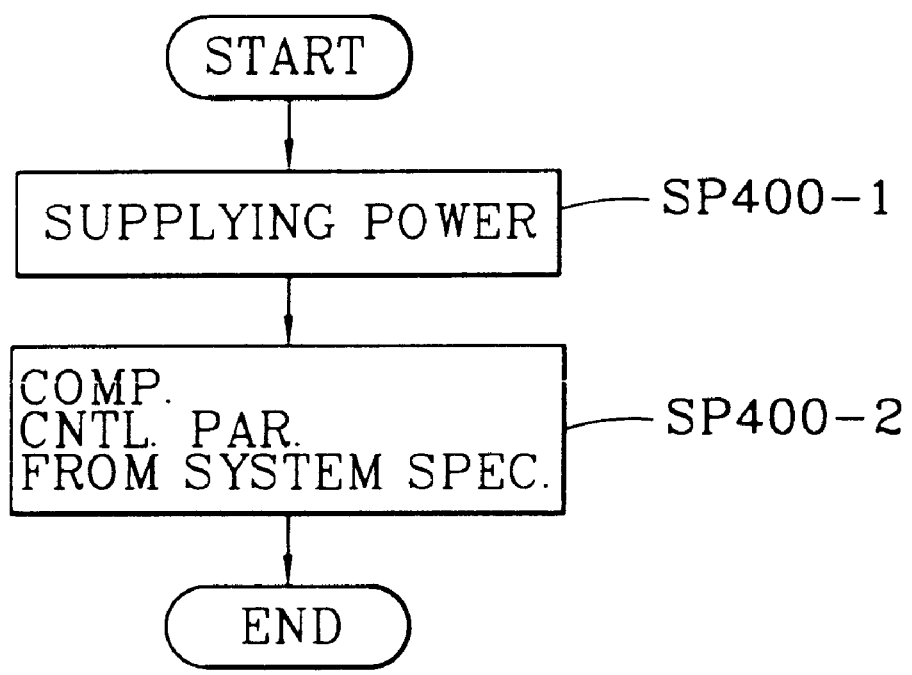
FIG. 14 is a flow chart for computing a control variable when an electric power is supplied to an elevator system according to the present invention.

FIG. 14 illustrates a sequence for converting the control parameter by the control parameter converting unit 400. When a power is supplied to the elevator system in Step SP 400-1, the control parameters are converted into the pulses and control period by the control parameter converting unit 400 based on the specification of the elevator system in Step SP 400-2. The control parameter converting unit 400 is performed one time when the power is supplied to the elevator system, and the converted parameters are supplied to the signal processing unit 600.

The operation of the velocity instruction generation apparatus for a car of the elevator system in accordance with the present invention will be explained with reference to the accompanying drawings.

Figure 15:
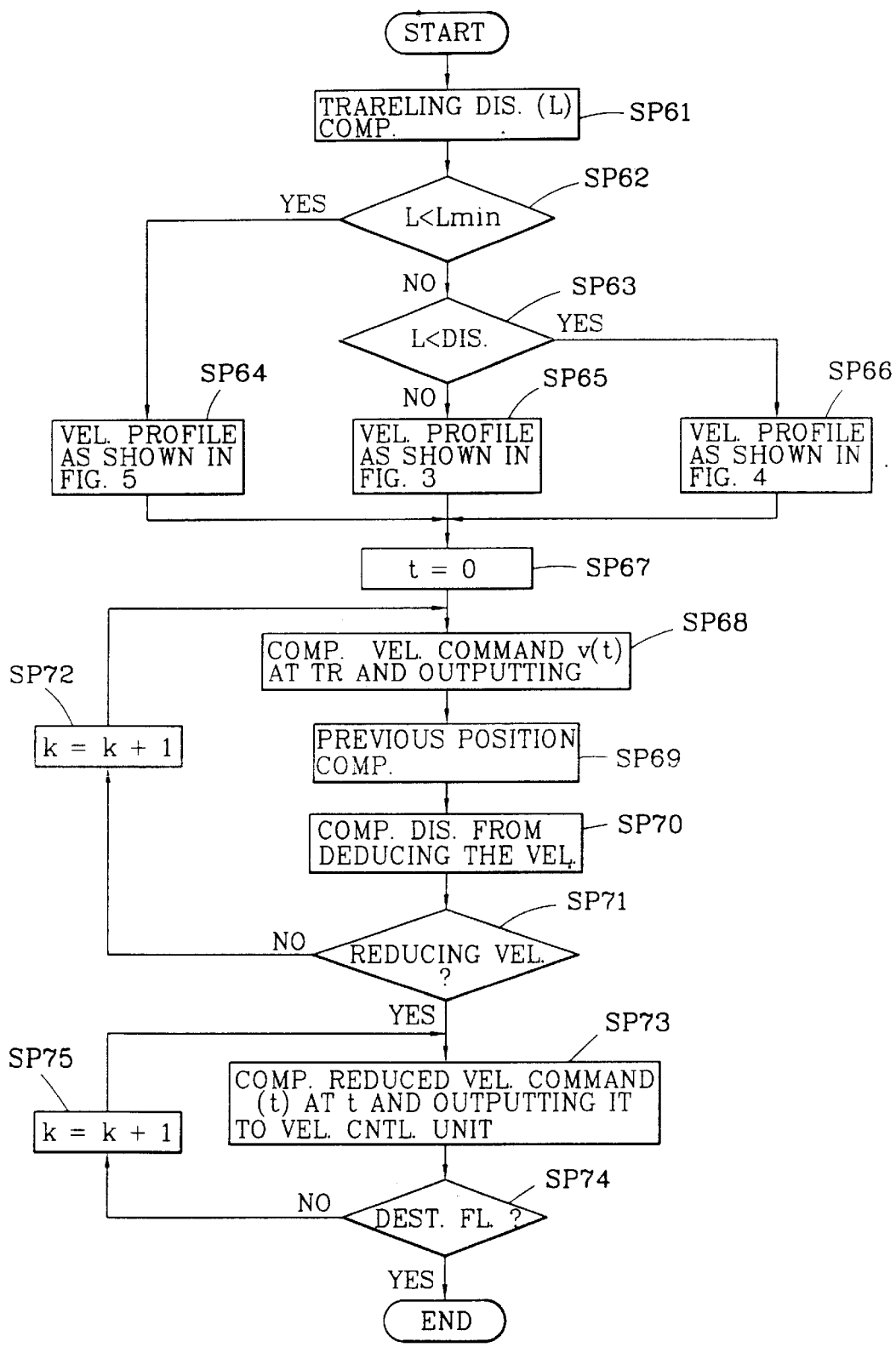
FIG. 15 is a flow chart illustrating a velocity instruction control method for an elevator system according to the present invention.

FIG. 15 illustrates a velocity instruction control method for an elevator system according to the present invention.

When a passenger calls a car, signal process unit 600 computes the running distance of the car by the unit of pulses using the pulses outputted from the rotary encoder 140 and generates the velocity instructions signal v(t) by the unit of the pulses for thereby controlling the elevator system. The distance over which the car runs is expressed by the unit of the pulses of the rotary encoder 140, and the running time is determined based on the control period k determined by the counter 114 of the operation controller 110. Here, the control period k is defined as a unit of the sampling number of pulse outputted from the encoder 140, and with respect to control period k, the velocity V(k), acceleration A(k) and jerk J(k) are expressed as in the following equations (7)~(9).

$$V(k) = \frac{E}{k} \quad (7)$$

$$A(k) = \frac{E}{k^2} \quad (8)$$

$$J(k) = \frac{E}{k^3} \quad (9)$$

Since the units of the distance between the current floor of the car 180 and the destination floor, to which the car 180 is moved, are not changed in equations (7)~(9), the distance is computed in integer value.

The velocity instruction control apparatus for an elevator system according to the present invention uses the sampling number of pulses outputted from the rotary encoder 140 by the unit of time. Therefore, the velocity v(k) is obtained based on the difference between the previous output pulse (E(k−1)) and the current output pulse E(k) of the encoder 140, which is obtained as following equation (10).

$$V(k)=E(k-1)-E(k) \quad (10)$$

The velocity instruction generation apparatus according to the present invention controls the operation of the car based on the velocity profile as shown in FIGS. 11~13. Namely, FIG. 11 illustrates the profiles of the velocity, acceleration and jerk to run a relatively long distance. The car reaches the maximum velocity and the maximum acceleration and then is decelerated and stops. FIG. 12 illustrates the profiles of the velocity, acceleration and jerk of the car to run an intermediate distance. In this state, the car does not run at maximum velocity but reaches the maximum acceleration and is decelerated and stops. FIG. 13 illustrates the profiles of the velocity, acceleration and jerk of the car to run short a relatively short distance. In this state, the car does not reach the maximum velocity and the maximum acceleration and is decelerated and stops.

Therefore, the operation by which the profiles as shown in FIGS. 11~13 are generated using the specification of the MKS system stored in the specification setting unit 300 will be explained.

As electric power is supplied to the elevator system, when the control circuit unit is operated, the signal process unit performs an initial stage that a specification of the MKS system stored in the specification setting unit 300 is received at an initial stage of the program, and the running distance and running time of the car are changed to the unit of the encoder pulse and the multiple time of the sampling time.

At this time, the number(PM) of the pulses per unit length is computed based on the gear ratio G and diameter of the traction machine (TM), a roping ratio R, the number of the encoder pulses (E) obtained during one rotation of the TM based on the following equation (12).

$$PM = \frac{G}{3.14 \times D \times R} \times E [\text{pulse}/m] \quad (12)$$

Therefore, the distance used for the control, for example, the length of the door zone plate and the length of the door zone are changed from the MKS system to the units of the encoder pulse (E). The velocity, acceleration and jerk are changed to the pulse unit using the control sampling time based on the following equations (12), (13), (14).

$$V\_TO\_TICK = \frac{PM}{\Delta t} \quad (12)$$

$$V\_TO\_TICK = \frac{PM}{\Delta t}$$

$$AV\_TO\_TICK = \frac{PM}{\Delta t^2} \quad (13)$$

$$J\_TO\_TICK = \frac{PM}{\Delta t^2} \quad (14)$$

Therefore, the rated velocity(V(k)) may be expressed as follows by changing the velocity parameter of the specification to the expression as shown in equation (15).

$$V(k)=V\_TO\_TICK \times V \quad (15)$$

The acceleration and jerk are changed in the same manner as equation (11) using equations (12) and (13). Therefore, all distances are expressed in the form of the encoder pulse (E), and the control sampling time($\Delta t$) becomes the unit time.

Therefore, the computation (SP 61) of the running distance as shown in FIG. 15, and the computation (SP 68) of the remaining distance, and the computation (SP 69) of the previous position are implemented by a simple integer computation, and all sampling time (k) is simply obtained based on the increase (k=k+1; SP 72, SP 75) of the integer number.

The velocity instruction signal V(k) has the unit of control period k by the equation change as shown in equation 15. Since the velocity instruction signal V(k) is formed in integer number, the velocity instruction signal is transferred to the velocity controller 800 at a certain period. At this time, the velocity controller 120 does not change the velocity instruction signal into the MKS system but outputs a velocity control signal for thereby controlling the motor.

The velocity instruction apparatus according to the present invention performs a computation by the unit of encoder pulses for thereby controlling the velocity of the car. In the case that the velocity or distance is displayed on an external unit such as a remote checking unit, the equation (11) is reversed and changed to the MKS system, so that a user can easily recognize.

Figure 16:
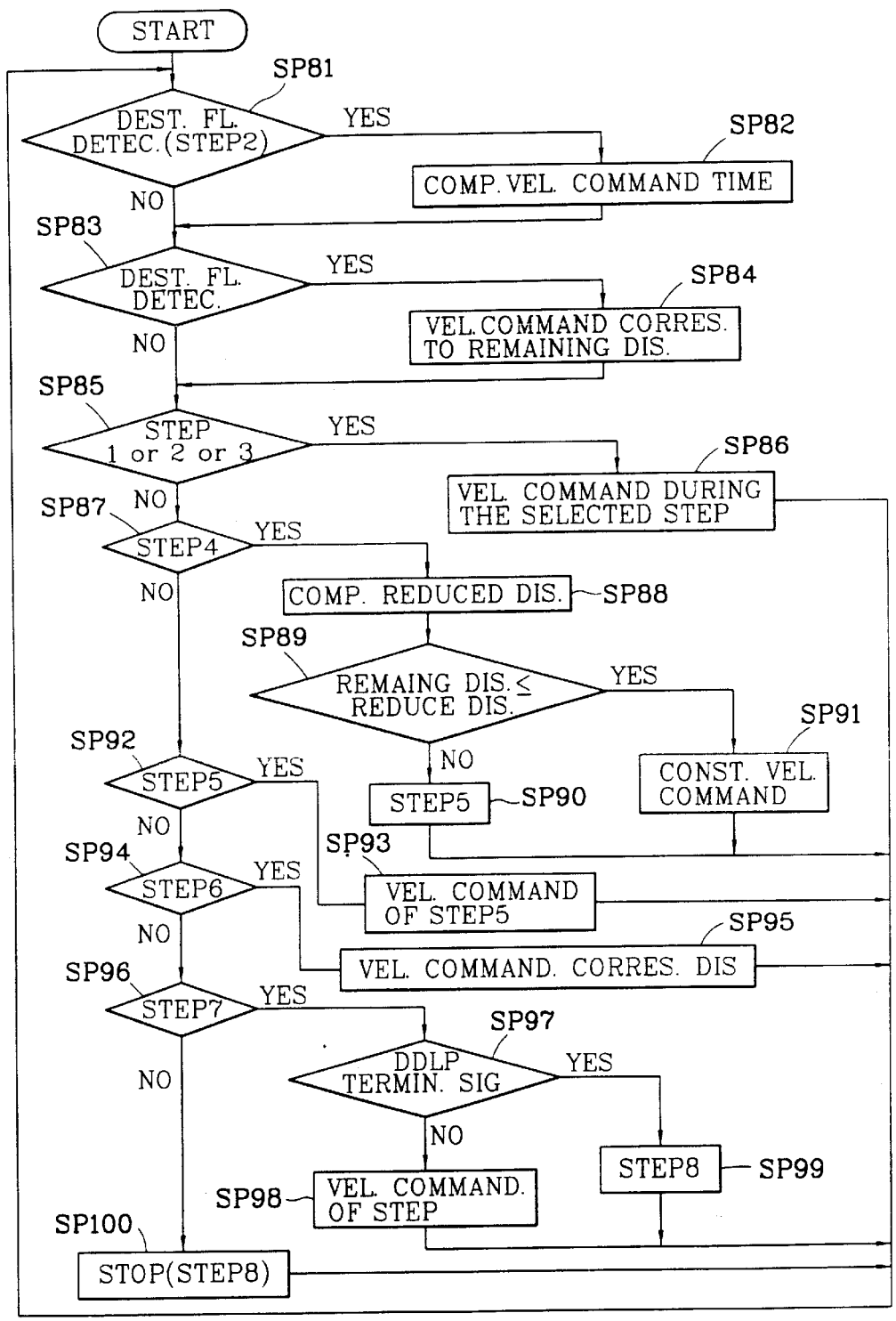
FIG. 16 is a flow chart illustrating a method for controlling a velocity of a car at each step of a velocity profile for an elevator system according to the present invention.
Figure 17:
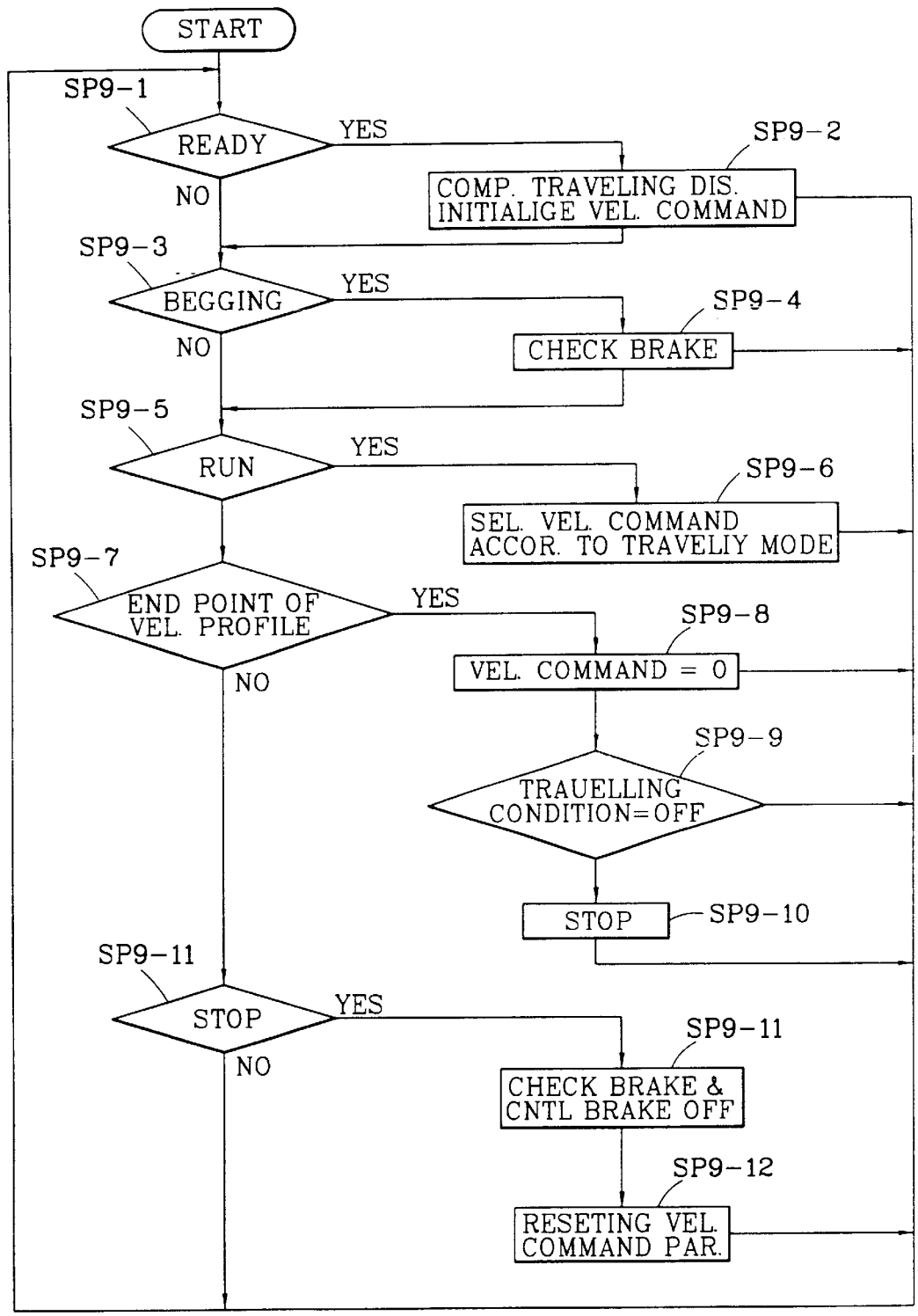
FIG. 17 is a flow chart illustrating an operation state control for an elevator system according to the present invention.

FIG. 16 illustrates another embodiment of the present invention. As shown therein, the distance is expressed in the number of pulses(E) of the encoder, and time is expressed by the control period k as the basic unit, so that the velocity is controlled.

The conversion of the units and the computation of the control variables will be explained.

When an elevator system is started up, the control parameter computation unit 400 obtains the control constants defined in the specification, and the MKS system of the control parameters are changed to the pulse unit and the control period units. The running distance is expressed by the number of output pulses of the encoder 700, and the time is expressed by the control period k of the system.

Therefore, in the case that the number of pulses is changed by every 1 m, the change constant is obtained, and the amount of the unit is changed. Even when the rated velocity of the elevator or the type of the winding machine is changed, it is possible to prevent any errors. The above-described method and the computation equation are as follows.

The equation for computing the number of rotations (RPM) is as follows.

The distance may be changed from the MKS units to the PCT units and may be computed based on the following equation(17).

$$distance[pulse]=E[pulse/m] \times distance[m] \quad (17)$$

The number of pulses(Pulse/m) outputted by 1m may be computed based on the following equation(18).

$$[pulse/m] = \frac{1}{2\pi r} \times \frac{1}{\text{Gear Rate}} \times (\text{slote of encoder}) \times \quad (18)$$
$$(\text{counter}) \times \text{Rope Rate}$$

The time may be changed from the MKS units to the PCT units and may be computed by the following equation (19).

$$PGD_{S-Tick} = \frac{1s}{\text{Control Period}} \quad (19)$$

The velocity may be changed from the MKS units to the PCT units and may be computed by the following equation (20).

$$PGD_{F-V-Tick}[P/CT] = \frac{pulse/m}{PGS_{S-Tick}} \quad (20)$$

The acceleration may be changed from the MKS units to the PCT units and may be computed by the following equation (21).

$$PGD_{F-V-Tick}[P/CT^2] = \frac{pulse/m}{PGD_{S-Tick}^2} \quad (21)$$

The jerk may be changed from the MKS units to the PCT units and may be computed by the following equation (22).

$$PGD_{F-V-Tick}[P/CT^2] = \frac{pulse/m}{PGD_{S-Tick}^3} \quad (22)$$

The elevator system may be in a certain state. For easier understanding, it is assumed that an electric power is supplied to the elevator system. In this state, the elevator system is performed.

After an electric power is supplied to the elevator system, in the case that the car is in the stop mode, when a car call is inputted from passenger. The elevator system starts the servo in Step SP10-1, and the elevator system becomes a ready state and then is operated in Step SP10-2. At this time, the running distance is computed, and the velocity instruction V(k) is initialized, and the floor/distance is computed in Step SP10-3. The destination floor is determined as an uppermost floor or a lowermost floor in accordance with the operation direction of the car 180. At an initial stage, the floor at which the car is stopped is not determined. During the running operation, the stop condition is met, the stop is determined.

The same processes as the flow chart of FIG. 16 are performed, and the long distance running operation and the short distance running operation are detected based on the running distance, and the velocity instruction is initialized, and the velocity instruction time based on the running distance is computed by the velocity instruction time computation unit 25.

In the beginning mode, the contact state of the motor 150 is checked in Step SP 10-4. If the state is on, the state is transited to the run mode in Step SP 10-6. At this time, the mode is transited to the run state. The previous floor computation and the remaining distance computation are performed by the signal process unit 600 and transmitted to the velocity controller 120. The velocity instruction is the same as the profile shown in FIG. 4.

At this time, the operation is performed in the same manner as the method of FIG. 15.

For example, when the destination floor at which the previous floor and the current become equal in the velocity instruction second step by the previous floor computation is detected, namely, when the short distance running is detected, the time of the velocity instruction step based on the total running distance is obtained to reset the running time of the velocity instruction second step. Thereafter, in the velocity instruction seventh step, the velocity instruction control right is transferred from the operation controller 110 to the velocity controller 120. The velocity controller 120 receives an arrival completion signal of the car. The mode is changed to the profile-end state in Step SP 10-8. When the mode is changed to the profile-end state(velocity instruction end), the velocity instruction (V(k)) is set at 0 and is transited to the stop state in Steps SP 10-9, SP 10-10, and SP 10-11.

The stop state is maintained. In this state, when there is a car call or other running conditions are met, the mode is changed to the ready state.

The states of the elevator system are repeatedly transited. The operation of the floor/distance and velocity instruction computation will be explained.

First, as the operation of the elevator system is started, when the motor 150 is rotated, the pulses are inputted from the rotary encoder 700. When the car 180 is moved to the destination floor, the position detector 190 transfers a detection signal to the signal process unit 600 whenever the car 180 passes through the plate 170.

Therefore, the signal process unit 600 computes a running distance using the output pulse from the rotary encoder 700 and receives a detection signal from the position detector 190, so that the current floor and the previous floor are computed based on the running distance of the car 180 and the door zone. In the velocity instruction generation apparatus for the elevator system, there are provided three cases; the car runs at the full velocity based on the running distance, and the car reaches the maximum acceleration but does not reach the full velocity, and the car does not reach both the maximum acceleration and the full velocity, so that the velocity of the car is effectively controlled based on the velocity profiles divided into the above-described three cases.

At this time, the signal process unit 600 computes the step-by-step running time, and the values used for the computation are defined as follows.

$$PGC_{Ref-V}[E/k]$$

$$PGC_{R-Ref-V}[E/k^2]$$

$$PGC_{Rise-T} = \frac{PGC_{Ref-V}}{PGC_{F-Ref-A}}[k]$$

$$f_j = PGC_{F-Ref-Jerk}[E/k^3]$$

$$PGD_{Tick-Count}; \text{Control Tick Counter}$$

$$PGD_{Prof-V}; \text{velocity instruction}$$

$$dist = \text{running distance}$$

Therefore, the velocity instruction computation unit determines the velocity instruction time using the above-described computation value. The above-described operation will be explained in detail.

First, in the case that there is an interval in which the car runs at full velocity, and the running distance(dist) has the conditions of equation (23), the running operation is determined as a long distance running operation.

$$dist > \frac{PGD_{Ref-A}^2 \cdot PGC_{Ref-V} + PGC_{Ref-V}^2 \cdot f_j}{f_j \cdot PGC_{Ref-A}} = \quad (23)$$

$$PGC_{Ref-V} \cdot \left( PGC_{Rise-T} + \frac{PGC_{Ref-V}}{PGC_{Ref-A}} \right)$$

The running time is determined by the following equations (24) and (25).

$$PGD_{T1} = PGD_{T3} = PGD_{T5} = PGD_{T7} = 1s \quad (24)$$

$$PGD_{T2} = PGD_{T6} \quad (25)$$

$$= -\frac{1}{2} \times \frac{PGC_{Ref-A}}{f_j} +$$

$$\frac{\sqrt{PGC_{Ref-A}^3 + 4 \times dist \times f_j^2}}{2 \times f_j \times \sqrt{PGC_{Ref-A}}} - PGD_{T1}$$

In addition, the velocity instruction computation unit determines the following cases as the short distance running operation.

(a) In the case that the car reaches the maximum acceleration but does not reach the full velocity, when the distance is obtained by the following equation (26), the car runs the short distance.

$$2 \times PGC_{Ref-A} \times PGC_{Rise-T}^2 \leq dist < \quad (26)$$

$$PGC_{Ref-V} \times \left( PGC_{Rise-V} + \frac{PGC_{Ref-V}}{PGC_{Ref-A}} \right)$$

At this time, the running time is computer by the following equation (27).

$$PGD_{T2} = PGD_{T6} \quad (28)$$

$$= -\frac{1}{2} \times \frac{PGC_{Ref-A}}{f_j} +$$

$$\frac{\sqrt{PGC_{Ref-A}^3 + 4 \times dist \times f_j^2}}{2 \times f_j \times \sqrt{PGC_{Ref-A}}} - PGD_{T1}$$

(b) In the case that the acceleration and velocity do not reach the maximum velocity, when the running distance is determined by the following equation (29), the car runs short distance.

$$2 \times (PGC_{Ref-A}) \times (PGC_{Rise-T})^2 > dist \quad (29)$$

At this time, the running time is determined by equation (30).

$$PGD_{T1} = \sqrt[3]{\frac{1}{2} \times \frac{dist}{f-j}} \quad (30\text{-}1)$$

$$PGD_{T2} = \sqrt[3]{4 \times \frac{dist}{f-j}} \quad (30\text{-}2)$$

-continued $$PGD_{T5} = \sqrt[3]{\frac{27}{2} \times \frac{dist}{f-j}} \qquad (30\text{-}3)$$

$$PGD_{T7} = \sqrt[3]{32 \times \frac{dist}{f-j}} \qquad (30\text{-}4)$$

Therefore, when the velocity instruction time is determined, the time based velocity instruction unit 608 and the distance based velocity instruction unit 609 generate a step-based velocity instruction. The time based velocity instruction unit (608) maintains an active state until the velocity instruction steps 1~5 (ST 1~ST 5), and the distance based velocity instruction unit (609) maintains an active state until the steps 6~7(ST 6, ST 7).

Here, the instruction method will be explained for each step.

(a) In the interval corresponding to the velocity instruction first step(ST 1), the acceleration(A) is varied in accordance with the time(t), so that the jerk (J), the acceleration (A), and the velocity(V) are obtained by the following Equation (31).

$$J_1(t) = j \qquad (31\text{-}1)$$

$$A_1(t) = \int J_1(t)dt = \int_0^t j\,dt = jt \qquad (31\text{-}2)$$

$$V_1(t) = \int A_1(t)dt = \int_0^t jt\,dt = \frac{1}{2}jt \qquad (31\text{-}3)$$

At this time, when changing the above-described equation based on the units of the pulse and the control period (Control Tick), the following Equation(34) is obtained.

$$end_{a1} = (VELOCITY)floor(f_j \times PGD_{Tick\text{-}Count})\ PGD_{Prof\text{-}V = (VELOCITY)}(0.5 \times f_j \times PGD_{Tick\text{-}Count} \times PGD_{Tick\text{-}Count}) \qquad (32)$$

After Step 1 (ST 1) is performed, the last velocity is determined as the initial velocity of Step 2(ST 2). This step is performed based on the following program.

$PGD_{Tick\text{-}Count})$
If $(PGD_{Tick\text{-}Count} \leq PGD_{T1})$
  Step 1 computation execution
else
  goto Step 2 computation (b) In the velocity instruction step 2 (ST 2) interval, 'Jerk' is '0', and the acceleration is uniform. Therefore, the computation is performed based on the following equation(35).

$$J_2(t) = 0 \qquad (33\text{-}1)$$

$$A_2(t) = \int J_2(t)dt + A_1(T_1) = A(T_1) = jT_1 = PG_{REF-ACC} \qquad (33\text{-}2)$$

$$V_2(t) = \int A_2(t)dt + V_1(T_1) \qquad (33\text{-}3)$$

$$= \int_0^t a\,dt + V_1(T_1)$$

$$= at + V_1(T_1)$$

At this time, when changing the above-described equation based on the units of the pulse/control period(Control Tick), the following equation(34) is obtained.

$$PGD_{Prof\text{-}V} = end_{a1} \times PGD_{Tick\text{-}Count} + end_{v1} \qquad (34)$$

Figure 1:
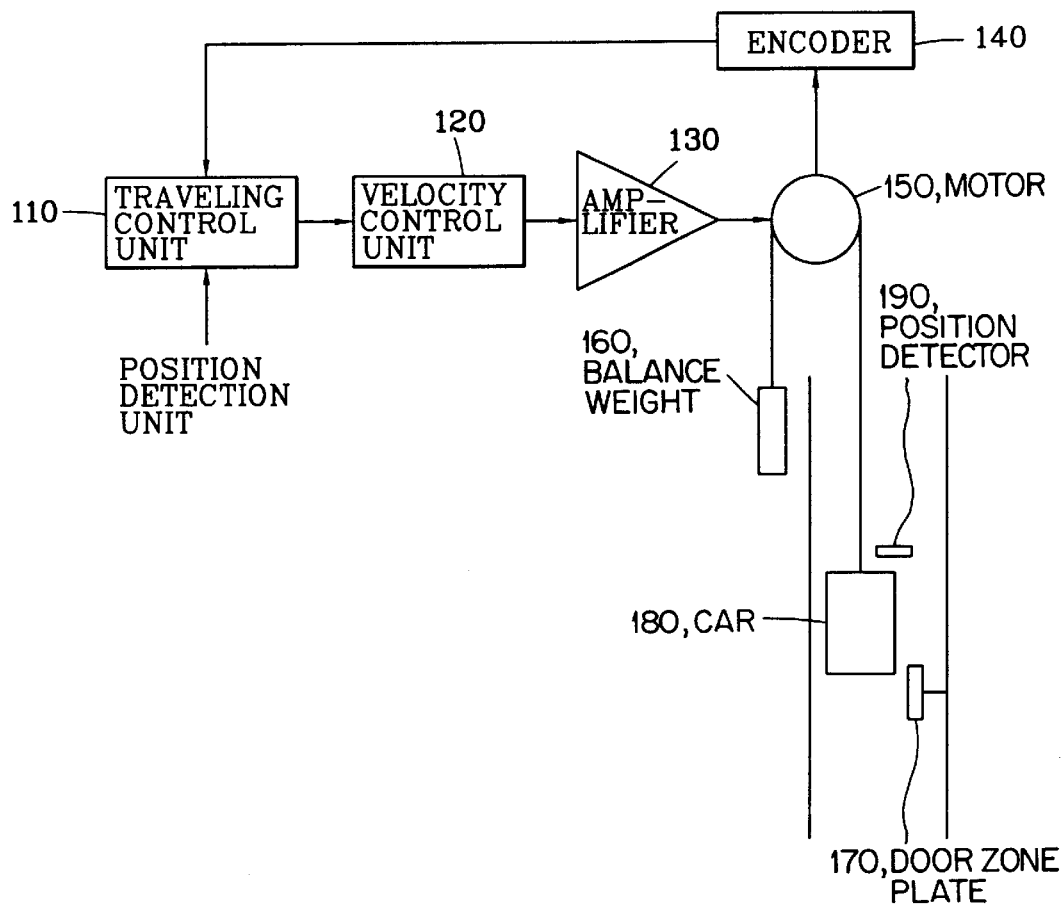
FIG. 1 is a view illustrating the construction of a conventional elevator system.
Figure 2:
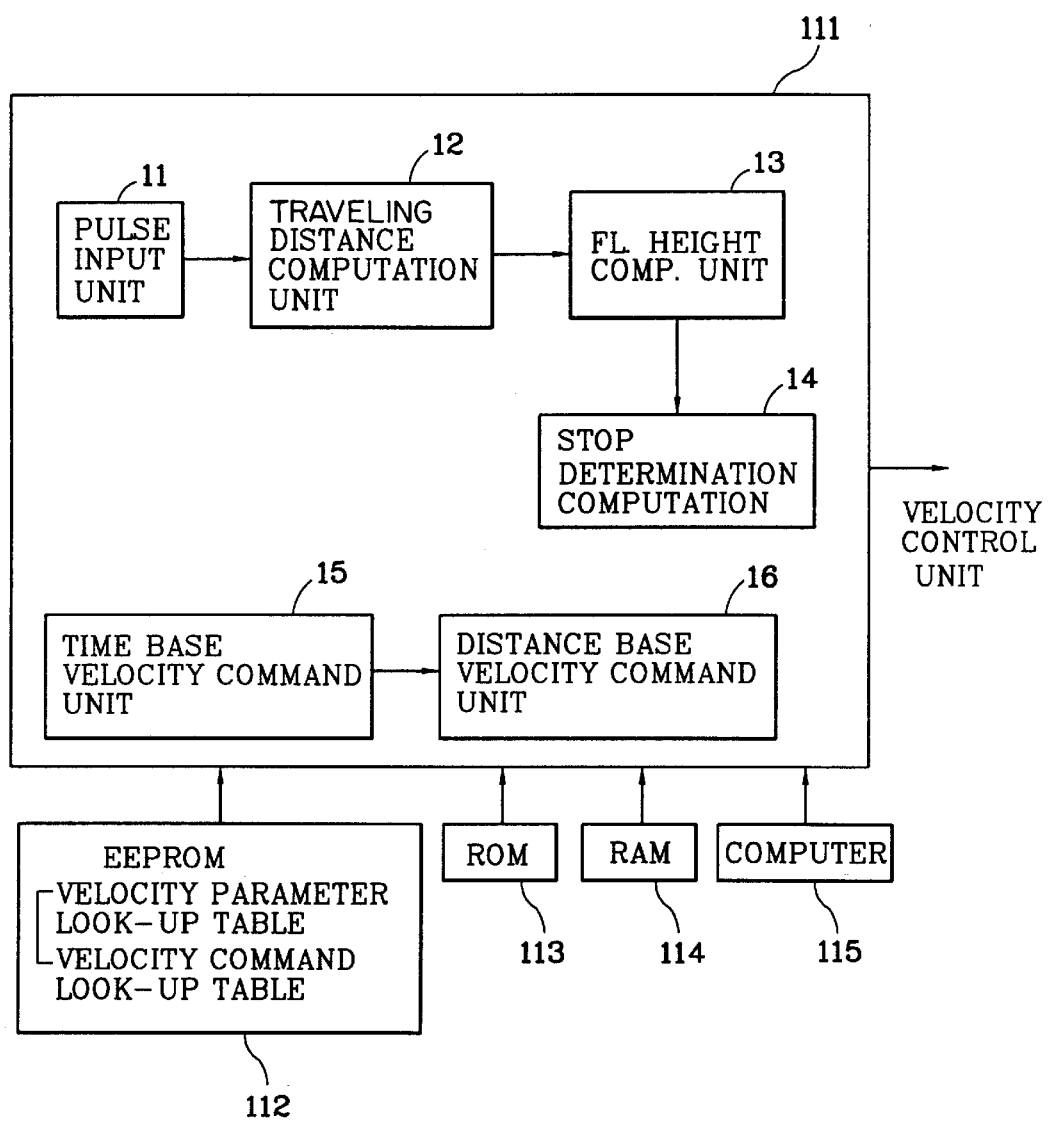
FIG. 2 is a view illustrating a conventional velocity instruction generation apparatus.
Figure 3:
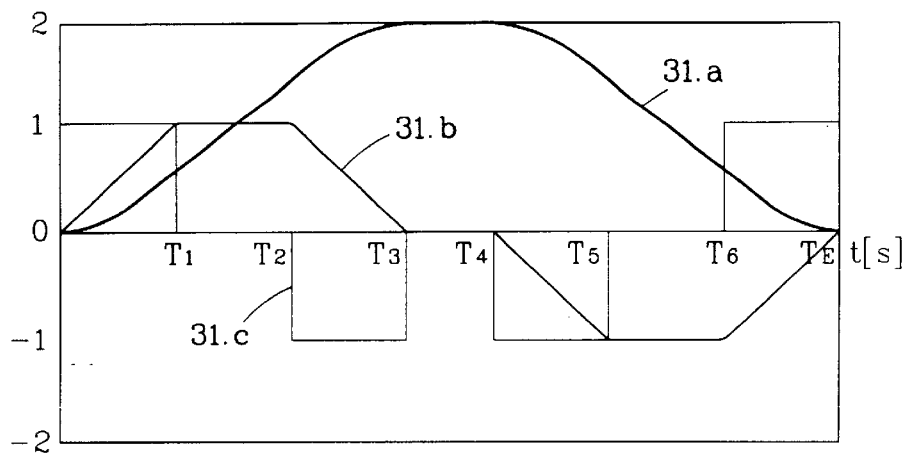
FIG. 3 is a view illustrating profiles with respect to a movement of a car when a car runs a relatively long distance.
Figure 4:
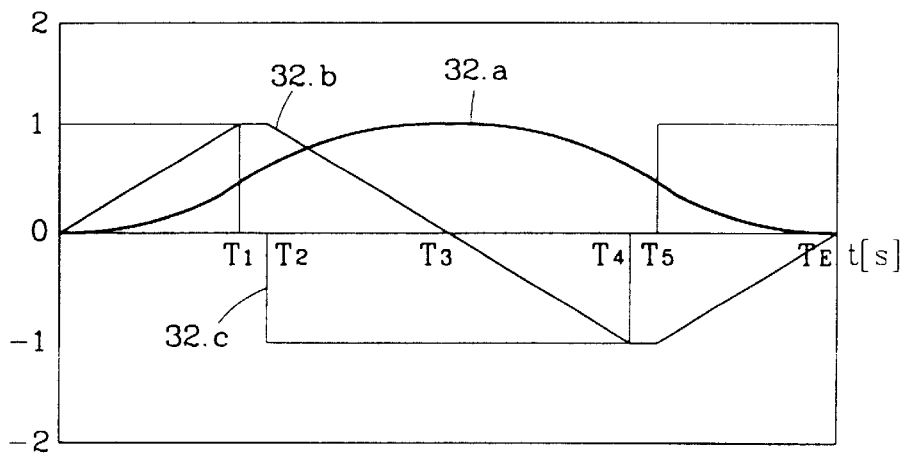
FIG. 4 is a view illustrating profiles with respect to a movement of a car when a car runs an intermediate distance.
Figure 5:
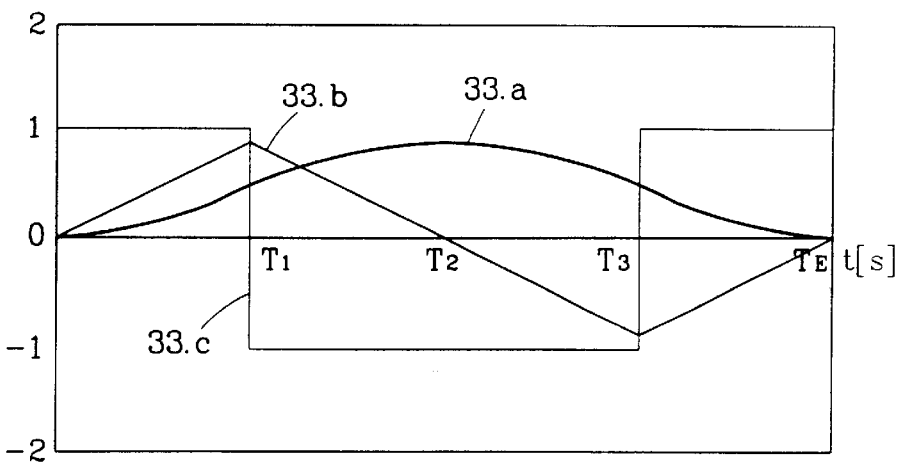
FIG. 5 is a view illustrating profiles with respect to a movement of a car when a car runs a relatively short distance.
Figure 6:
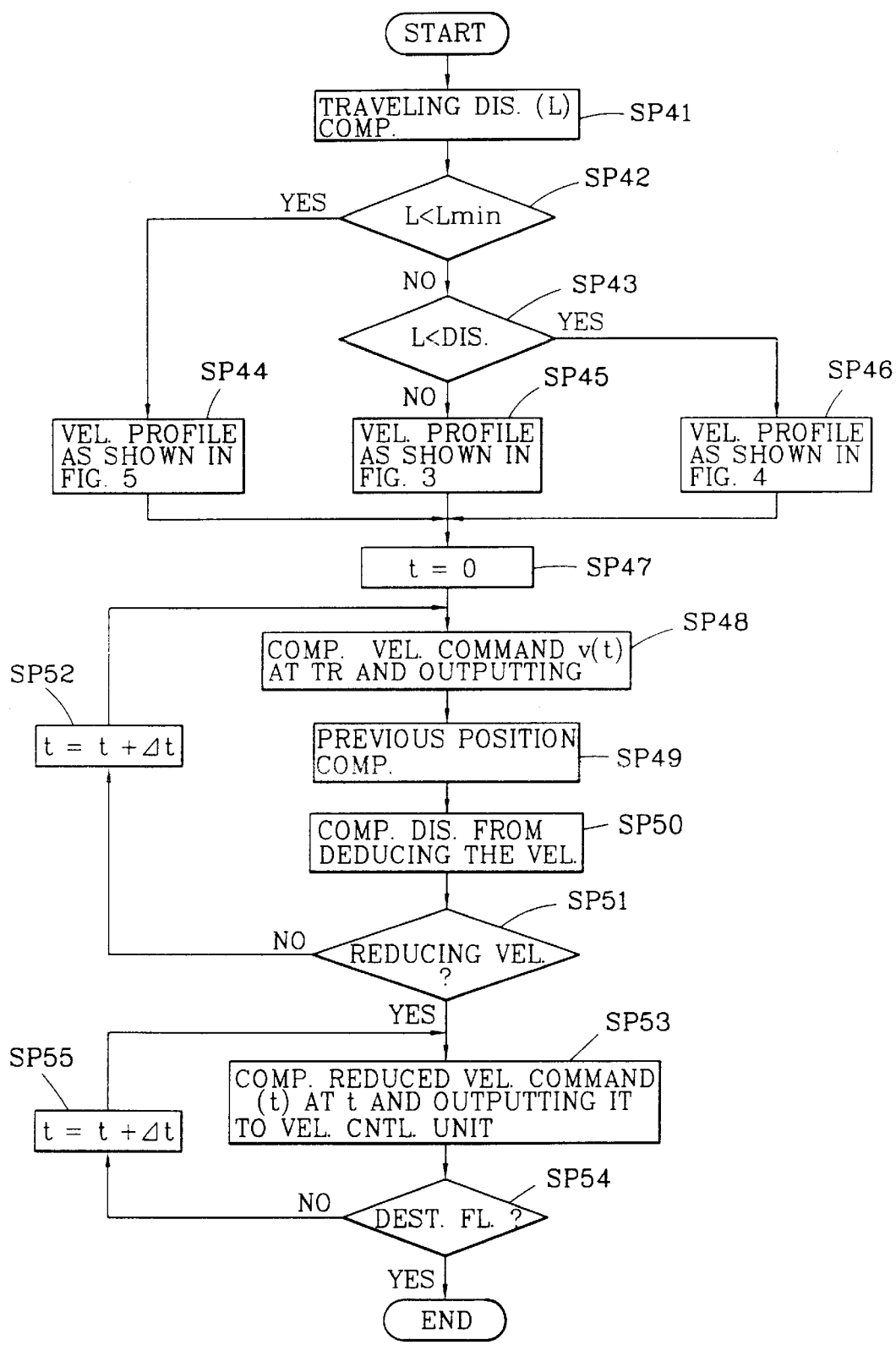
FIG. 6 is a flow chart illustrating a real time velocity instruction control method for a conventional elevator system.

As shown in FIG. 4, in the case of the long distance, the operation is performed until the rated velocity (–) is obtained because the velocity of P1 is the same as the rated velocity of P2. On the contrary, in the case of the short distance, the operation is performing during the time (T2) with respect to the short distance. The above-described operation is performed based on the following program.

if((LONG$_{DIST}$& &(PGD$_{Prof\text{-}V}$<(PGC$_{Ref\text{-}V}$–end$_{v1}$))
  ‖(NotLONG$_{DIST}$& &(PGD$_{Tick\text{-}Count}$≦PGD$_{T2}$)))
  Step 2 computation execution
else
  goto Step 3 computation execution In the detection of the short distance operation, the floors at which the car stops are determined by performing Steps 1 and 2, and the running distance computation unit 222 determines the running distance. At this time, since the time of the step 2 is varied, the running time of each step is obtained, and the running time of the step 2 is reset.

(c) In the velocity instruction third step(ST 3) interval, 'Jerk' is '–j', and the acceleration(A) is decreased based on the time(t). Therefore, the computation is performed based on the following equation (35).

$$J_3(t) = -j \qquad (35\text{-}1)$$

$$A_3(t) = \int J_3(t)dt + A_2(T_2) = \int_0^t (-j)dt + a = -jt + a \qquad (35\text{-}2)$$

$$V_3(t) = \int A_3(t)dt + V_2(T_2) \qquad (35\text{-}3)$$

$$= \int_0^t (-jt + a)dt + V_2(T_2)$$

$$= at - \frac{1}{2}jt^2 + V_2(T_2)$$

At this time, when changing the above-described equation based on the units of the pulse/control period, the following equation(36) is obtained.

$$PDG_{Prof\text{-}V} = (SIGNED)(end_a \times PGD_{Tick\text{-}Count}) - 0.5 \times f_j \times PGD_{Tick\text{-}Count} \times PGD_{Tick\text{-}Count} + end_{v2} \qquad (36)$$

Therefore, in the case of the long distance, the operation is performed until the rated velocity is obtained, and in the short distance, the operation is performed during the time (T3) with respect to the short distance. The above-described operation is performed based on the following program.

if ((LONG$_{DIST}$& &(PGD$_{Prof\text{-}V}$<(PGC$_{Ref\text{-}V}$))
  ‖(NotLONG$_{DIST}$& &(PGD$_{Tick\text{-}count}$≦PGD$_{T3}$))
  Step 3 Execution
else
  goto Step 4

(d) In the velocity instruction step 4(ST 4) interval, the last velocity of the step 3 is outputted based on the equation (37) irrespective of the long and short distances.

$$PGD\_Prof\_V = end\_v3 \qquad (37)$$

Thereafter, when the previous floor and the destination floor become same, namely, when the position detector (190) is engaged with the door zone plate (170) and detects a stop floor, the elevator system recognizes the remaining running distance. At this time, the distance based velocity instruction is expressed by the following equation (38).

$$Rdist-V = \sqrt{2 \times a \times (\text{Remaining Distance} - S)} \qquad (38)$$

Here, the remaining distance represents the distance between the car position to the destination floor, and 'S' represents the velocity instruction based on the remaining distance of FIG. 10A, namely, a value corresponding to the distance of the rounded value in Step7.

When the difference between the remaining distance velocity and the velocity of the step 4 is below a certain value(D) computed based on the equation (39), the routine is moved to Step 5. The above-described operation is performed based on the following program.

$$D = \frac{1}{2}aT \tag{39}$$

if (velocity of Rdist_V_STEP4>D)
   Step 4 execution
   else
   goto Step5

(e) In the velocity instruction step 5(ST 5) interval, 'Jerk' is '−j', and the acceleration(A) is decreased depending on elapse of the time, and the computation is performed based on the following equation (40).

$$J_4(t) = -j \tag{40-1}$$

$$A_4(t) = \int J_4(t)dt + A_3(T_3) = \int_0^t (-j)dt + 0 = -jt \tag{40-2}$$

$$V_4(t) = \int A_4(t)dt + V_3(T_3) = \int_0^t (-jt + a)dt + V_3(T_3) \tag{40-3}$$
$$= at - \frac{1}{2}jt^2 + V_3(T_3)$$

At this time, the above-described equations are changed to equation (41) of the pulse/control period(Control Tick).

$$PGD_{Prof-V}=(VELOCITY)(end_{v4})-0.5 \times f_j \times PGD_{Tick-Count} \times PGD_{Tick-Count} \tag{41}$$

The routine is performed during the time(T5) of the step 5(ST5), or the routine is moved to the step 6 when the computed velocity value exceeds the remaining distance velocity value. The above-described operation is performed based on the following program.

if (($PGD_{Tick-Count} \leq PGD_{T5}$)& &($PGD_{Prof-V} \leq Rdist_v$))
   Step 5 execution
   else
   goto Step 6 execution (f) In the velocity instruction step 6(ST 6) interval, the distance based computation is performed. As seen in equation (42), the remaining distance based velocity is transmitted as an instruction value.

$$PGD_{Prof-V=RdistV} \tag{42}$$

At this time, when the remaining distance is 800 mm (PGC_DSP_Landing Point), a DDLP ON signal is transferred to state control unit for thereby informing a landing read state, and in a state that the DDLP signal is ON, when the LDD and LDU are ON, the landing round is performed.

In this case, the velocity instruction at the signal process unit 600 is neglected.

The routine is performed based on the following program. When the LDC of the landing floor is inputted, the routine is moved to the step 7.

if (Not DoorZone && current floor=previous floor)
   Step 6 execution
   else
   goto Step 7 execution (g) In the velocity instruction step 7 (ST 7) interval, the moved distance is counted using the computation period and velocity (DSP) of the velocity controller(120) for thereby implementing an accurate landing operation. At this time, the velocity controller 120 is formed of a DDLP (DSP Digital Landing Process) and receives a DoorZone of the landing floor and controls the movement during the period corresponding to the number of pulses corresponding to the 'DoorZone/2'.

In addition, the instruction velocity is determined based on the remaining distance based velocity instruction. If the instruction velocity is smaller than a certain value, the current state is maintained.

At this time, the velocity instruction of the operation controller 11 is neglected. Namely, the velocity is continuously maintained at the velocity instruction step 6 (ST6) for implementing a continuity of the link point.

When the Break On instruction (SVD_Inv_DDLP_Break) is on at the side of the inverter, the routine is moved to the velocity instruction step 8 (ST 8), and the following program is performed.

if (Not SVD_Inv_DDLP_Break)
   Step 7 execution
   else
   goto Step 8

(h) In the velocity instruction step 8 (ST 8) interval, the velocity instruction is determined as '0', and the operation state is transited to 'Profile-End'.

In the velocity instruction generating apparatus for a car of the elevator system and a velocity control method therefore according to the present invention, the velocity of the car is controlled in real time based on the velocity profile obtained by dividing the velocity instruction V(k) into eight steps when the car runs long distance. The velocity instruction is computed in real time based on each velocity profile when the car runs intermediate distance and short distance for thereby controlling the velocity of the car.

Therefore, in the velocity instruction generating apparatus for a car of the elevator system and a velocity control method according to the present invention, the spec of the elevator system of the MKS system is changed to the units of the pulse control period, so that it is possible to perform the velocity of the car in real time by computing the control variables based on the integer numbers.

In addition, in the present invention, since the velocity instruction is computed in accordance with the velocity variables in real time for thereby controlling the elevator system, by controlling the elevator, the resolution ability of the velocity instruction is increased for thereby implementing a good boarding-on feel and accurate landing of the car. In the present invention, since it is possible to provide various data depending on the minimum velocity variable spec for various system installation sites, the amount of spec which is to be inputted is decreased, and the productivity is increased.

Therefore, the present invention having the above-described effects is applicable to all type elevator systems irrespective of the construction of the elevator system.

What is claimed is:

1. A velocity instruction generating apparatus for a car of an elevator system, comprising:

a state controller for detecting a state of an elevator system and outputting a certain control signal;

a rotation detection unit for detecting the rotation of a motor and outputting a pulse signal;

a spec setting unit for storing an installation site spec of the elevator system;

a control variable converting unit for converting a unit of a control variable used for controlling the velocity of the car into a unit of a pulse control period from the installation site spec unit defined in the spec setting unit;

a signal processing unit for receiving a control signal from the state controller and a control variable having the pulse control period unit converted by the control variable converting unit and outputting a velocity control signal for controlling the velocity of the car; and a velocity controller for receiving a velocity control signal from the signal processing unit and controlling the velocity of the motor.

2. The apparatus of 1, wherein said state controller receives a signal from a call button used for calling a certain car, a signal from a destination floor selection button for moving a user to the destination floor, and signals outputted from an upper position detection unit for detecting whether the car lands at the destination floor, the landing position detection unit and lower side position detection unit.

3. The apparatus of claim 1, wherein said rotation detection unit is a rotary encoder.

4. The apparatus of claim 1, wherein in said spec setting unit, the spec of the elevator system is defined by the MKS unit, and said spec can be changed based on the installation site of the elevator system.

5. The apparatus of claim 1, wherein said control variable converting unit converts the spec of the elevator system set by the spec setting unit one time when a power is supplied to the elevator system into a pulse control period and outputs the converted signal to the signal processing unit.

6. The apparatus of claim 1, wherein said signal processing unit includes:

a floor height memory unit for memorizing the height of each floor and the height of the floors at a building;

a running distance computation unit for computing a running distance, over which the car runs, between a floor(destination floor) designated by a user and the current floor of the car;

a velocity profile determining unit for determining a running velocity of the car based on the running distance computed by the running distance computation unit;

a remaining distance computation unit for computing the remaining distance over which the car runs to the destination floor based on an inputted pulse when the car runs based on the determined velocity profile;

a stop floor computation unit for computing a stop floor of the car based on the remaining distance computed by the remaining distance computation unit and a floor position of the car computed by a floor position computation unit;

a velocity instruction time computation unit for computing a velocity instruction time for each interval based on the velocity profile;

a time-based velocity computation unit for computing the velocity based on the velocity instruction time for each interval; and a distance based velocity computation unit for detecting the floor position of the car computed by the floor position computation unit and computing the distance based velocity instruction based on the detected position when the car arrives at a certain position before the car lands at the destination floor.

7. The apparatus of claim 1, wherein said signal processing unit computes the velocity instruction in real time based on an integer number computation method using the control variables converted by the control variable converting unit.

8. The apparatus of claim 1, wherein said velocity instruction is classified into long distance, intermediate distance and short distance running velocity profiles based on a distance over which a car runs.

9. The apparatus of claim 8, wherein said long distance running profile is a profile by which the car reaches a maximum velocity and maximum acceleration and decelerates and stops, and said intermediate distance running profile is a profile by which the car does not reach the maximum velocity but reaches the maximum acceleration and decelerates and stops, and said short distance running profile is a profile by which the car does not reach both the maximum velocity and the maximum acceleration but decelerates and stop.

10. The apparatus of claim 1, wherein said control period uses a software timer.

11. The apparatus of claim 1, wherein said velocity controller generates a time based velocity instruction in the acceleration and normal velocity interval and generates a distance based velocity instruction in the deceleration interval.

12. The apparatus of claim 1, wherein said velocity controller computes the velocity instruction time when determining the car stop position for thereby controlling a short distance operation of the car.

13. The apparatus of claim 12, further comprising:

a short distance operation control for decreasing an acceleration of the car by performing a round computation when the car stops at a certain platform and generating a distance-based velocity instruction irrespective of the control of the motor for thereby minimizing the velocity instruction.

14. The method of claim 13, wherein said velocity profiles are classified into a profile by which the car reaches a maximum velocity and maximum acceleration and decelerates and stops based on a car running distance, a profile by which the car does not reach the maximum velocity but reaches the maximum acceleration and decelerates and stops, and a profile by which the car does not reach the maximum velocity and the maximum acceleration but decelerates and stops.

15. A velocity instruction generating method for a car of an elevator system, comprising:

computing a control variable by converting the units of a control variable from a system spec to units of a pulse of an encoder and a control period k associated with the system and storing the computed control variable;

determining a velocity profile based on a running distance over which the car runs when there is a car call from a user;

generating a velocity instruction for operation of the car based on the velocity profile;

detecting a position at which the car decelerates from the velocity profile;

generating a time based deceleration instruction, operating the car based on the deceleration instruction;

generating a distance based velocity instruction when the car arrives at a certain position corresponding to the door zone; and operating the car based on the distance based velocity instruction and stopping the car.

16. A method of generating velocity instruction for an elevator system comprising:

computing a control variable converting the units of a control variable in a system specification to units of a pulse of an encoder and control period associated with the system;

generating an integer-computed velocity instruction based on the computed control variable;

controlling the running operation of the car in real time in accordance with the integer computed velocity instruction.

17. The method of claim 16, wherein the units of the system specification are MKS units.

18. The method of claim 17, wherein the unit of the pulse control period is expressed by the time defined by a pulse from a rotary encoder and a timing signal of the elevator system.

* * * * *